United States Patent
Pavlov et al.

[11] 3,875,635
[45] Apr. 8, 1975

[54] METHOD OF FORMING GLOBOID WORM THREAD AND WORM WHEEL TEETH

[75] Inventors: Arseny Mikhailovich Pavlov; Mikhail Mikhailovich Bogatsky, both of Leningrad, U.S.S.R.

[73] Assignees: Leningradsky Metallichesky zavod imeni XXII siezda KPSS; Leningradsky Institut Textilnoi i legkoi promyshlennosti imeni S.M. KIROVA, both of Leningrad, U.S.S.R.

[22] Filed: Apr. 15, 1974

[21] Appl. No.: 461,254

[52] U.S. Cl. ............... 29/159.2; 40/129 B; 51/287; 51/DIG. 1; 90/3
[51] Int. Cl. .................... B21h 5/00; B23p 15/14
[58] Field of Search...... 29/159.2; 40/61, 62, 129 B; 90/9, 7, 3, 7.5; 51/287, DIG. 1

[56] References Cited
UNITED STATES PATENTS

| | | | |
|---|---|---|---|
| 1,751,540 | 3/1930 | Cone | 90/3 |
| 2,935,886 | 5/1960 | Wildhaber | 29/159.2 X |
| 3,105,332 | 10/1963 | Wildhaber | 51/287 |
| 3,641,708 | 2/1972 | Strejc | 51/287 X |
| 3,745,712 | 7/1973 | Hajsman | 51/287 X |

FOREIGN PATENTS OR APPLICATIONS
1,963,693   9/1970   Germany ........................... 90/3

*Primary Examiner*—C. W. Lanham
*Assistant Examiner*—Victor A. DiPalma
*Attorney, Agent, or Firm*—Lilling & Siegel

[57] ABSTRACT

A method of forming globoid worm thread and worm wheel teeth by making a worm blank into globoidal form and then positioning same with its axis of rotation inclined in a vertical plane to an angle equal to the worm helix angle at the pitch point. Prior to cutting the worm thread, the center-to-center distance is increased according to a formula provided herein. The worm thread is finished by means of a grinding wheel, the face of which is orientated identically with the working edge of the cutting tool. The worm-wheel is formed by means of a hob identical with the preliminarily cut worm, and the worm gear produced by this method features initial point contact which remains correct in the event of mounting inaccuracy.

9 Claims, 4 Drawing Figures

METHOD OF FORMING GLOBOID WORM THREAD AND WORM WHEEL TEETH

BACKGROUND OF THE INVENTION

This invention relates to worm gearing and has particular reference to worm gears employing a non-cylindrical worm having a form approximating a globoid.

As a rule, this type of worm gearing finds use in the drives of hoisting and transport mechanisms wherever increased load capacity or compactness of the drive is required.

It is known to form elements of worm gearing employing a non-cylindrical worm by the use of grinding wheels moved circumferentially in the worm plane or in a plane parallel thereto. With this method, many parameters of the gearing are altered and in the event of mounting inaccuracy the given gear ratio cannot be maintained in spite of high precision and finish of the mating surfaces. See, for example, P. S. Zak, Globoid Gearing, Mashgiz Publishers, 1962; P. S. Zak, Y. I. Bogin, D. E. Goller, Research in Worm and Reduction Gears, proceedings of VNIIPTUGLEMASH, 8th Edition, Nedra Publishers, 1965; Y. I. Diker and L. I. Sagin, Fundamentals of Worm Gearing Production, Mashgiz Publishers, 1960.

SUMMARY OF THE INVENTION

It is therefore an object of the present invention to provide a method of forming globoid worm thread and worm-wheel teeth, whereby a worm gear with a localized contact area can be produced.

It is another object of the present invention to provide a worm gear capable of maintaining the given gear ratio in the event of mounting inaccuracy, and to provide a worm gear adapted to be rapidly run in under load and one having the features of improved efficiency and load capacity.

These and other objects are achieved by providing a method of forming globoid worm thread and worm-wheel teeth whereby the worm thread is preliminarily cut in the blank and, after hardening, is finally formed by grinding. The worm blank is machined with its axis of rotation inclined in a vertical plane to an angle equal to the worm helix angle at the pitch point located on the gearing center line, due to which the plane of rotation of the tool cutting edges, which passes through the pitch point parallel to the plane of the machine table, is set perpendicular to the worm helix at the pitch point and the working faces of the right and left cutting tools are set in mirror symmetry. The cutting edges of the tools are inclined relative to the gearing center line at an angle equal to the pressure angle of the gearing. Prior to cutting the worm thread, the machining center-to-center distance is increased to exceed the nominal distance between the axes of the worm and worm-wheel in the gearing produced. After the worm thread has been cut and the worm surface hardened, the cutting tool is replaced by a grinding wheel with a straight-surface working face which is orientated identically with the tool cutting edge and moved circumferentially in said plane. The teeth of the mating worm-wheel are formed by means of a hob, the cutting edges of which are disposed on a surface identical with that of the preliminarily cut worm.

The method of the present invention thereby achieves a precision-made and well-finished thread on a hardened globoid worm and ensures correct mesh with the worm-wheel teeth in a plane perpendicular to the worm helix at the pitch point.

According to the invention, said increase in the machining center-to-center distance is effected so that the pitch radius of the imaginary wheel is:

$$R_f = Z_f r \sin \beta$$

where $R_f=$ the pitch radius of the imaginary wheel (the imaginary wheel representing successive circumferential positions of the straight cutting edge of the cutting tool and the grinding wheel face occupied at a pitch equal to the normal pitch at the pitch point);

$Z_f=$ the whole number of teeth in the imaginary wheel; $r =$ worm pitch radius in the center plane;

$\beta=$ worm helix angle at the pitch point.

With these conditions obtained, the gearing, after it has been assembled and run in, gives the minimum curvature at the pitch point for efficient lubrication conditions.

According to the invention, the teeth of the mating worm-wheel are formed by the helical generating surface of a hob whose straight faces contact the working surfaces of the ground worm in a plane perpendicular to the worm helix at the pitch point.

Thereby a globoid worm gear is obtained wherein several pairs of simultaneously meshing teeth make initial point contact, the line of action being a curve lying in a plane perpendicular to the worm helix at the pitch point. At each point of said line of action the normal to the contacting surface passes through the pitch point, which provides for the maintenance of the given gear ratio in the event of mounting inaccuracy.

This property enables the gearing to be used as a dividing pair in machine tool gear trains.

The worm gear produced by the method of the present invention can be assembled without too much attention to mounting accuracy.

Owing to high precision of machining and close contact between the working surfaces, the time required to run in the worm gear under load is shortened.

The improvement of the lubrication conditions at the places of contact results in a higher load capacity and efficiency of the gearing.

The metrological and performance parameters of the gearing, which are largely determined by the method of tooth formation, feature stability.

Since this method gives well-finished ground surface of the worm thread, cheap substitutes for tin bronze can be employed in the making of the worm-wheel rim.

BRIEF DESCRIPTION OF THE DRAWINGS

Now the invention will be described in detail with reference to the accompanying drawing in which.

DESCRIPTION OF THE PREFERRED EMBODIMENT

Figure 1:
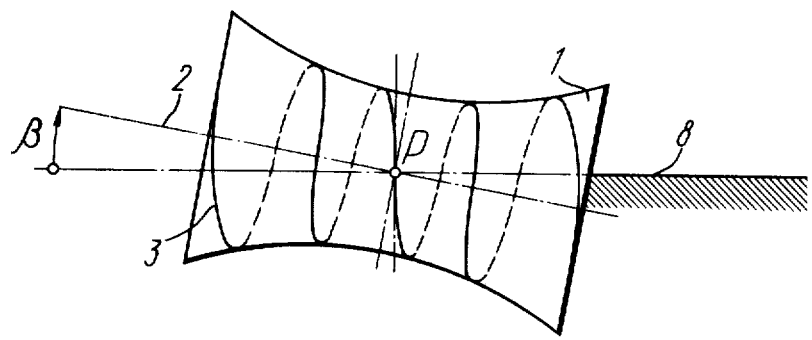
FIG. 1 illustrates schematically the position of the worm in machining according to the invention.
Figure 2:
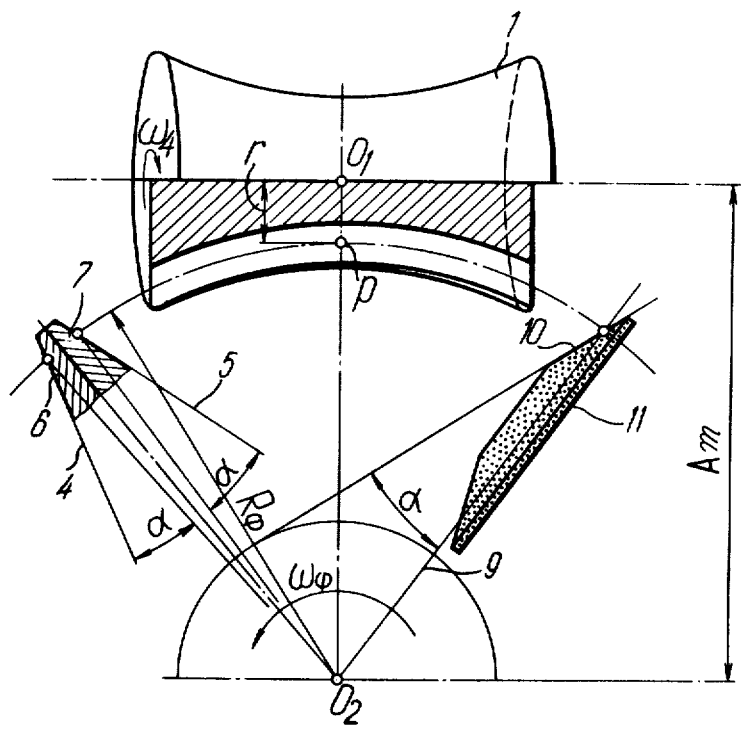
FIG. 2 the position of the cutting tools and grinding wheel according to the invention.
Figure 3:
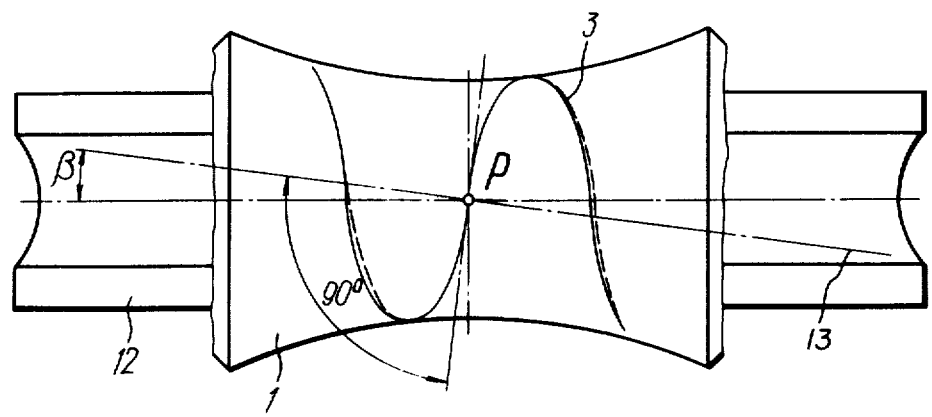
FIG. 3 is a diagrammatic view of the worm gear according to the invention.

A steel worm blank 1 as best shown in FIG. 1, having a hardness of about 30 Rc, is turned in a suitable lathe to globoidal form. This blank is clamped in the spindle of a gear-cutting machine (not shown). The axis 2 of the spindle is inclined to the center line $O_1O_2$ (FIG. 2) at an angle $\beta$ equal to the angle of the worm helix 3 at the pitch point P located on the center line $O_1O_2$ at the distance $O_1P = r$ from the worm center $O_1$.

The angle $\beta$ is found from the known formula $$\operatorname{tg} \beta = i \frac{A-r}{r} \quad (1)$$

where
$i$ = the given gear ratio;
A = the nominal distance between the axes of the worm and worm-wheel;
$r$ = the pitch radius of the worm in its center plane.

The cutting edges of like tools 6 and 7 are positioned in a cutting plane 8 which is parallel to the plane of the machine table (not shown) and passes through the center line $O_1O_2$.

Inasmuch as the spindle axis 2 is inclined at the angle $\beta$, the cutting plane 8 is perpendicular to the worm helix 3 at the pitch point P and the working faces of the right and left cutting tools 6 and 7 are in mirror symmetry (not shown).

The angles $\alpha$ between the tool cutting edges and the radius 9 of the imaginary wheel are equal to the pressure angle of the gearing (the imaginary wheel is understood to means successive circumferential positions of the cutting edge at the pitch radius $R_f$ occupied at a pitch equal to the normal pitch at the point P).

The pitch radius $R_f$ of the imaginary wheel is found from $$R_f = Z_f\, r\, \sin \beta \quad (2)$$

where
$R_f$ = the pitch radius of the imaginary wheel;
$Z_f$ = the whole number of teeth in the imaginary wheel.

For a non-cylindrical worm and its worm-wheel to mesh properly, the pitch radius of the imaginary wheel must not be less than the value determined by the formula $$R_{f\min} = \frac{(A-r)\, r}{r - A \sin^2} \quad (3)$$

The center-to-center distance for machining the worm is found from $$A_m = R_f + r \quad (4)$$

During the worm thread cutting process the cutting edges 4 and 5 rotate about the imaginary wheel axis $O_2$ in the direction $\omega_f$, whereas the worm 1 rotates about the spindle axis 2 in the direction $\omega_4$. The gear train of the machine must be set to give the ratio $$\frac{\omega_4}{\omega_f} = \frac{Z_f}{Z_4} \quad (5)$$

where
$\omega_4$ = angular velocity of the worm;
$\omega_f$ = angular velocity of the imaginary wheel;
$Z_f$ = number of teeth in the imaginary wheel;
$Z_4$ = number of threads in the worm.

To speed up the cutting process, use is made of multiple cutting heads wherein the cutting edges are positioned identically with the cutting edges 4 and 5.

After the worm thread has been cut and hardened to about 50 Rc, it is finished by means of a grinding wheel 11 having a straight-surface working face 10. The face 10 of the grinding wheel 11 is positioned in the cutting plane 8 identically with the edge 4 of the left cutting tool and is moved as described previously. In this case the right side of the worm thread is formed. To grind the left side of the worm thread, the face 10 of the grinding wheel 11 is positioned identically with the edge 5 of the right cutting tool by inverting the grinding wheel 11. The direction of rotation of the imaginary wheel remains unchanged.

The rim of the worm-wheel 12 is made of bronze or other suitable substitutes. The worm-wheel teeth are formed by means of a hob the cutting edges of which are disposed on a surface identical with that of the preliminarily cut worm. Prior to hobbing, the worm-wheel blank is mounted on the machine table and the hob is fitted in the spindle. The hob must have datum surfaces identical with those of the worm, and the hob axis is positioned perpendicular to the axis of the worm-wheel to be machined.

Rough hobbing is carried out by radially nearing the axes of the hob and worm-wheel to the nominal center distance of the gearing. Finish hobbing is carried out at the nominal center distance by rotatively feeding the worm-wheel to the hob.

In the globoid worm gear produced by the method which constitutes the present invention, several pairs of simultaneously meshing teeth make correct point contact, the mesh occurring in the plane 13 which is perpendicular to the worm helix 3 at the pitch point P.

Such point contact enables the worm gear to overcome mounting inaccuracies since the line of action is a curve lying in the mesh plane 13 and at each point of said line of action the normal to the contacting surface passes through the pitch point P.

Figure 4:
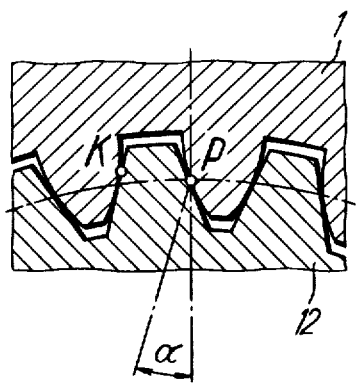
FIG. 4 is a fragmentary sectional view taken through the worm gear in the plane of mesh.

At the point K, as best shown in FIG. 4, the surfaces of the worm 1 and the worm-wheel 12, being theoretically in a point contact, fit each other snugly. Due to this fact, the elastic deformation of the tooth working surfaces engenders a localized contact area which gradually increases as the surfaces become run in. Owing to such localized contact areas, the worm gear is run in rapidly and has a high load capacity.

Although the present invention has been described in some detail by way of illustration and example for purposes of clarity of understanding, it will, of course, be understood that various changes and modifications may be made in the form, details, and arrangement of the parts without departing from the scope of the invention as set forth in the claims.

What is claimed is:

1. A method of forming a globoid worm having thread means for mating with the tooth surfaces of a co-operatively associated worm gearing wheel, comprising: forming a steel cylindrical blank so as to generate a globoidal blank form, mounting said formed worm blank on a spindle in a machine having a table and positioning same with the spindle axis inclined in a vertical plane at an angle equal to the worm helix angle at the pitch point located on the gearing center line, increasing the center-to-center distance so as to exceed the nominal distance between the axes of said worm and said worm-wheel in the gearing to be made, rotating the worm clockwise about said spindle axes and cutting the worm such that the plane of rotation of the tool cutting edges, which passes through the pitch point parallel to the plane of said machine table, is set perpendicular to the worm helix angle at the pitch point, and the side plane of a right cutting tool and a left cutting tool form a mirror image; said cutting edges being inclined relative to the gearing center line at an angle equal to the pressure angle of the gearing to be made at the pitch point; the rotation of said cutting edges being counterclockwise about an imaginary wheel axis; hardening said worm after said cutting step; and finishing said cut worm thread by grinding same with a grinding wheel having a straight-surface working face oriented identically with the tool cutting edge and moving said grinding wheel circumferentially in said plane.

2. The method according to claim 1, wherein the increase in the machining center-to-center distance is effected so that the pitch radius of the imaginary wheel is $$R_f = Z_f\, r \sin \beta$$

where $R_f$ = the pitch radius of the imaginary wheel (the imaginary wheel is understood to mean successive circumferential positions of the straight cutting edge of the cutting tool and the grinding wheel face occupied at a pitch equal to the normal pitch at the pitch point);
$Z_f$ = the whole number of teeth in the imaginary wheel;
$r$ = worm pitch radius in the center plane;
$\beta$ = worm helix angle at the pitch point.

3. The method according to claim 1, wherein said worm is hardened to 30 Rc.

4. The method according to claim 1, wherein the cutting of said worm is accelerated by the use of multiple cutting tool heads having cutting edges positioned identically with the cutting edges of said left and right cutting tool.

5. The method according to claim 1, wherein said grinding step is achieved by first positioning the straight-surface working face of said grinding wheel in said cutting plane identically as the left edge of said left cutting tool and moving said grinding wheel until the right side of the worm thread is finish ground, and then inverting the grinding wheel so that its straight-surface working face is positioned in said cutting plane identically as the right side of said right cutting tool and moving said grinding wheel until the left side of the worm thread is finish ground.

6. The method according to claim 1, including hobbing the worm-wheel teeth by means of a hob having cutting edges disposed on a surface identical with that of said cut worm.

7. The method according to claim 6, wherein the working surfaces of the worm wheel teeth are formed by the helical generating surface of said hob, the straight faces of said hob contacting the working surfaces of the ground worm in a plane perpendicular to the worm helix at the pitch point.

8. The method according to claim 7, including the steps of mounting said worm-wheel on said machine table, and fitting said hob on said spindle; said hob having datum surfaces identical to those of said worm, and the hob axis is positioned perpendicular to the axis of the worm-wheel.

9. The method according to claim 6, wherein rough hobbing is carried out by heating the hob to the worm-wheel until the axes of the hob and worm-wheel are radially near the nominal center distance of the gearing, and finish hobbing is carried out at the nominal center distance by rotatively feeding the worm-wheel to said hob.

* * * * *